(12) United States Patent
Campbell et al.

(10) Patent No.: US 8,024,730 B2
(45) Date of Patent: Sep. 20, 2011

(54) SWITCHING BETWEEN PROTECTED MODE ENVIRONMENTS UTILIZING VIRTUAL MACHINE FUNCTIONALITY

(75) Inventors: Randolph L. Campbell, Folsom, CA (US); Gehad M Galal, Rancho Cordova, CA (US)

(73) Assignee: Intel Corporation, Santa Clara, CA (US)

( * ) Notice: Subject to any disclaimer, the term of this patent is extended or adjusted under 35 U.S.C. 154(b) by 1519 days.

(21) Appl. No.: 10/814,216

(22) Filed: Mar. 31, 2004

(65) Prior Publication Data

US 2005/0223225 A1 Oct. 6, 2005

(51) Int. Cl.
*G06F 9/46* (2006.01)

(52) U.S. Cl. ...................................................... 718/100
(58) Field of Classification Search ................... 718/100
See application file for complete search history.

(56) References Cited

U.S. PATENT DOCUMENTS

| | | | |
|---|---|---|---|
| 3,996,449 A | 12/1976 | Attanasio et al. | |
| 4,787,031 A | 11/1988 | Karger et al. | |
| 5,459,869 A | 10/1995 | Spilo | |
| 5,956,408 A | 9/1999 | Arnold | |
| 6,044,478 A | 3/2000 | Green | |
| 6,175,924 B1 | 1/2001 | Arnold | |
| 6,397,242 B1 | 5/2002 | Devine et al. | |
| 6,496,847 B1 * | 12/2002 | Bugnion et al. | 718/1 |
| 6,698,017 B1 * | 2/2004 | Adamovits et al. | 717/168 |
| 6,704,925 B1 | 3/2004 | Bugnion | |
| 7,111,146 B1 | 9/2006 | Anvin | |
| 2005/0091354 A1 * | 4/2005 | Lowell et al. | 709/223 |
| 2005/0091365 A1 | 4/2005 | Lowell et al. | |

FOREIGN PATENT DOCUMENTS

WO WO-0021238 4/2000

OTHER PUBLICATIONS

Cox, Richard , "A Virtual Memory Management Unit for Denali", Intel Research Seattle,(Oct. 16, 2002).
INTEL, "Twenty-to-One Consolidation on Intel Architecture", (Feb. 2002).
Munro, Jay , "Virtual Machines & VMware, Part I", Copyright (c) Ziff Media Inc.,(2001).
Office Action for U.S. Appl. No. 10/814,218 Mailed Sep. 20, 2007.
U.S. Appl. No. 10/881,847 Office Action mailed Nov. 24, 2008.
U.S. Appl. No. 10/881,847 Final Office Action, mailed Apr. 27, 2009.
U.S. Appl. No. 10/881,847 Notice of Allowance dated Aug. 20, 2009.

* cited by examiner

*Primary Examiner* — Meng A An
*Assistant Examiner* — Mengyao Zhe
(74) *Attorney, Agent, or Firm* — Blakely, Sokoloff, Taylor & Zafman LLP (57) ABSTRACT

Disclosed is a processor having a normal execution mode and a host execution mode. A virtual machine monitor (VMM) operable in conjunction with the host execution mode creates at least one protected mode environment to operate guest software in a protected memory area. Responsive to a command to switch between protected modes, the VMM causes the processor to atomically switch between an original protected mode environment and a target protected mode environment. A virtual machine execution (VMX) mode may be utilized to enable virtual machine functionality for use in switching between protected modes.

16 Claims, 5 Drawing Sheets

SWITCHING BETWEEN PROTECTED MODE ENVIRONMENTS UTILIZING VIRTUAL MACHINE FUNCTIONALITY

FIELD

Embodiments of the invention relate to switching between protected mode environments utilizing virtual machine functionality.

DESCRIPTION OF RELATED ART

Advances in processors and communication technologies have opened up many opportunities for applications that go beyond the traditional ways of doing business. Electronic Commerce (E-Commerce) and Business-to-Business (B2B) transactions are now becoming more popular and are conducted throughout global markets at continuously increasing rates. Unfortunately, while modem computers provide users convenient and efficient methods of doing business, communicating and transacting, they are also vulnerable to attacks.

Examples of these types of attacks include virus, intrusion, security breach, and tampering, to name a few. These attacks, which are often deliberate, may interfere with the normal operation of the system, may destroy files and other important data, and/or may be used to surreptitiously gain access to classified information. Computer security, therefore, is becoming more and more important to protect the integrity of the computer systems and increase the trust of users.

Unfortunately, today, most security software is relatively independent of the hardware on which it is running and therefore cannot use hardware features to increase the level of protections. Thus, the level of protection may be completely dependent on the security software. However the security software itself is subject to software attack, and thus provides only limited protection.

Attempts have also been made to isolate a protected environment from non-protected environment within a system. Many of these implementations attempt to isolate non-trusted software from the protected environment while inherently trusting other software, such as the operating system. However, the operating system, may itself be untrustworthy due to corruption from updates or upgrades or from other untrustworthy or potentially hostile sources.

Other attempts have been made to switch between different protected mode environments within a system. However, in order to accomplish this, utilizing current methodologies, the original protected mode environment must first ensure that its own code is mapped into the target protected environment's address space. After this, the transition between the original protected environment to the target protect environment is accomplished in a piecemeal fashion by switching various control registers and updating various memory and interrupt descriptor tables in a piecemeal fashion.

Unfortunately, there is a period of time during this piecemeal process when the state of the processor is inconsistent, containing partial states from both environments. This inconsistent state may result in problems associated with faults and page misses, which could possibly cause a system reset or crash. Accordingly, current methodologies for switching between different protected modes in a system introduce a great deal of system instability.

DETAILED DESCRIPTION

In the following description, the various embodiments of the invention will be described in detail. However, such details are included to facilitate understanding of the invention and to describe exemplary embodiments for employing the invention. Such details should not be used to limit the invention to the particular embodiments described because other variations and embodiments are possible while staying within the scope of the invention. Furthermore, although numerous details are set forth in order to provide a thorough understanding of the embodiments of the invention, it will be apparent to one skilled in the art that these specific details are not required in order to practice the embodiments of the invention. In other instances details such as, well-known methods, types of data, protocols, procedures, components, electrical structures and circuits, are not described in detail, or are shown in block diagram form, in order not to obscure the invention. Moreover, embodiments of the invention will be described in particular embodiments but may be implemented in hardware, software, firmware, middleware, or a combination thereof.

It should be noted that generally the terms computer system, processing system, computing system, computing device, computer, etc., refers to any sort of computing or networking device (e.g. computer, server, file server, application server, workstation, mainframe, network computer, laptop computer, mobile computing device, palm pilot, personal digital assistant, cell-phone, integrated circuit, fax machine, printer, copier, set-top box, etc.) that includes a processor, and/or a memory, and/or input/output devices, etc., or any sort of device, machine, or system capable of implementing instructions.

Figure 1:
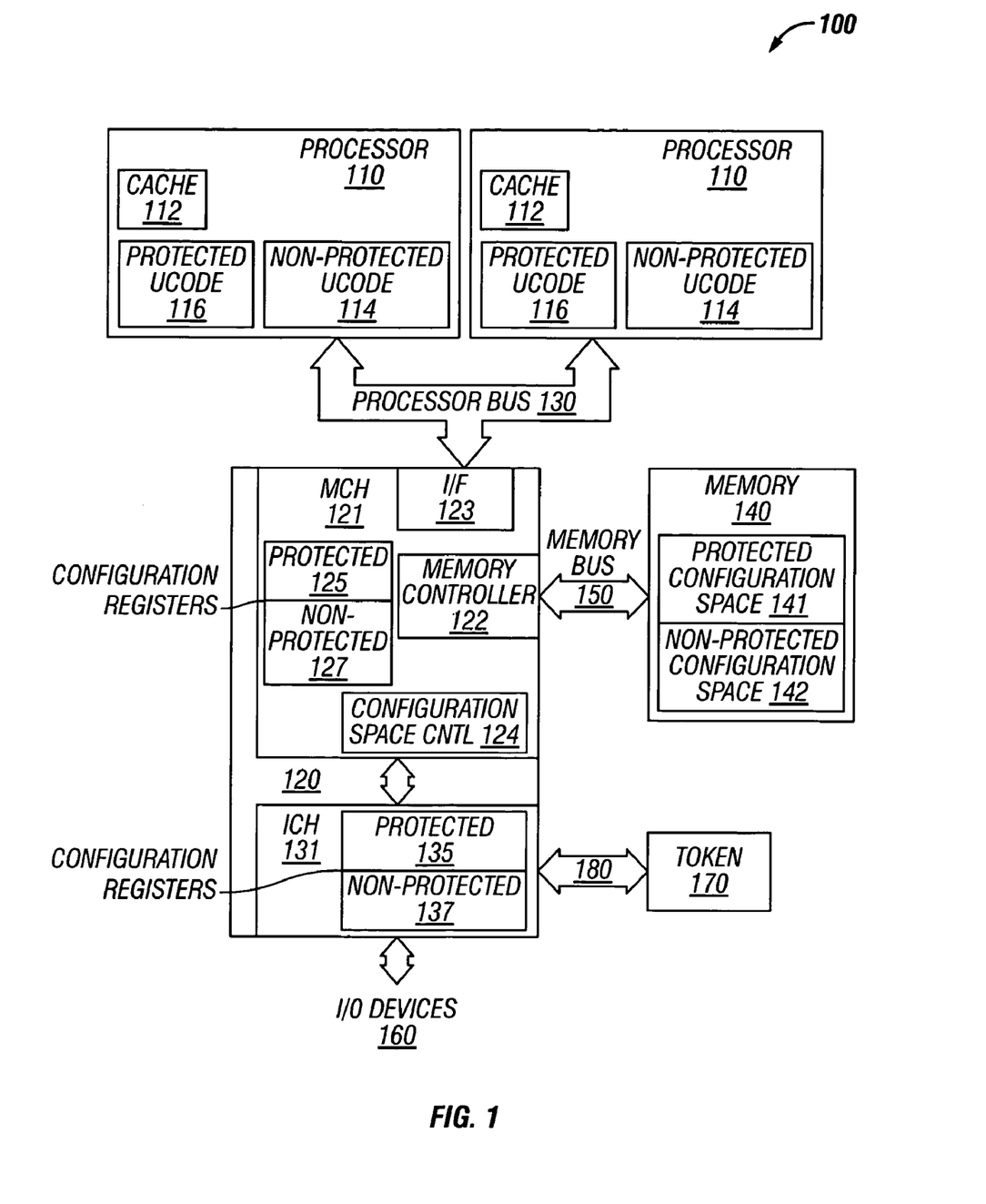
FIG. 1 shows a block diagram of a computing system, according to one embodiment of the invention.

FIG. 1 shows a block diagram of a computing system, according to one embodiment of the invention. Although FIG. 1 shows a particular configuration of system components, various embodiments of the invention may use other configurations. The illustrated system 100 includes one or more computing systems in the form of one or more processors 110 (two are shown in the illustrated embodiment, but one, three or more may be used), a memory 140, a logic circuit 120 coupled to the memory 140 through memory bus 150 and coupled to the processor(s) 110 through processor bus 130, and a token 170 coupled to the logic circuit 120 over bus 180.

Each processor 110 may include various elements, including any or all of: 1) cache memory 112, 2) non-protected microcode (uCode) 114, and 3) protected microcode 116. Microcode includes circuitry to generate operations and micro-operations in the execution of instructions, where instructions may include both program (software-implementable) operations and operations triggered by hardware events that may not be directly programmable. Protected microcode 116 includes microcode that may be executed only by protected instructions and/or as part of a protected operation. Non-protected microcode may be executed outside those restrictions. Microcode that initiates a command over processor bus 130 may identify the command as a protected command in various ways, including but not limited to: 1) asserting one or more particular control lines on the bus, 2) placing a predetermined identifier on the bus, 3) placing predetermined data on the data lines, 4) placing a predetermined address on the address lines, 5) asserting certain signals with timing that is unique to protected commands, etc. While in one embodiment the protected microcode 116 is co-resident with the non-protected microcode 114, in another embodiment the protected microcode 116 is physically and/or logically separate from the non-protected microcode 114.

Memory 140 may include all of main memory. However, some of the potential address space that would potentially be accessed in memory 140 may be reserved for other purposes, and accesses to those reserved addresses may be redirected to other parts of the system. Configuration space may be reserved in this manner. Configuration "space" is a conceptual term that refers to the range(s) of addresses that are reserved for implementation in logic circuit 120 for various activities, with accesses that are targeted to any address within the configuration space being redirected to various portions of logic circuit 120 rather than to memory 140 or to input-output devices.

FIG. 1 shows protected configurations space 141 and non-protected configuration space 142, which represent the ranges of addressable locations that are reserved for control and monitoring activities (protected and non-protected activities, respectively) that are implemented in logic circuit 120. Configuration space may be implemented with addresses that would otherwise be part of memory address space or input-output (I/O) address space. Read or write commands to at least a portion of the addresses in the configurations space are redirected to configurations registers in logic circuit 120. In some embodiments, other portions of the addresses in the configurations space are used for commands that trigger some type of action within the logic circuit 120 rather than being used to store data in, or read data from, a register. In still another embodiment, commands directed to specific addresses in the configuration space may be temporarily placed in registers before being passed on to circuits external to logic circuit 120 (e.g., to token 170 over bus 180).

While in one embodiment one or both of the protected configurations space 141 and non-protected configurations space 142 contain only contiguous addresses, in another embodiment the addresses are not all contiguous. As used herein, the term "contiguous" may refer to contiguous in physical memory space or contiguous virtual memory space.

Logic circuit 120 may include various components, such as but not limited to: interface (I/F) 123 to decode the destination address of any command received over processor bus 130, memory controller 122 to control operations over memory bus 150, configuration registers 125, 127, 135 and 137, and configuration space control logic 124 to control operations within logic circuit 120. In one embodiment logic circuit 120 includes memory control hub (MCH) 121 and I/O control hub (ICH) 131, which may be implemented as separate integrated circuits. In an alternate embodiment, logic circuit 120 may be organized differently than shown in FIG. 1, and may be implemented within one or more integrated circuits in any suitable manner.

In one embodiment, I/F 123 may receive the commands seen on processor bus 130 and decode the destination addresses to determine how to respond. Configuration space control logic 124 may be used to convert some decoded addresses into the appropriate response. Such response may include, but is not limited to:

1) in response to the address being directed to another device on the processor bus 130, ignore the command,
2) in response to the address being directed to a viable location in memory 140, initiate the indicated read or write operation to memory 140 over memory bus 150,
3) in response to the address being directed to one of I/O devices 160, pass the command along to the I/O device over the appropriate bus,
4) in response to the address being directed to configuration space, determine which of the following actions is associated with that particular address and perform that action: a) perform the indicated read or write operation on the configuration register specified by the address, b) initiate a non-read/write action within logic circuit 120, c) send a read, write or other command to token 170 over bus 180 (in one embodiment, token 170 contains protected information associated with various cryptographic and/or validations processes), d) abort the command if the command indicates an operation that is not permitted.

Such impermissible operations may include but are not limited to: performing a non-protected operation in protected configuration space, performing a protected operation that is currently restricted, and performing a protected operation in an impermissible format. Aborting a command may take various forms, including but not limited to: timing out without responding, responding with an error code, responding with meaningless data (e.g., all 0's or all 1's), exiting the protected operational environment, and performing a system reset.

In one embodiment, the configuration registers include protected configuration registers 125, 135, and non-protected configuration registers 127, 137. Protected configurations registers may be used to control and monitor protected operations, and may be inaccessible to non-protected software and/or hardware, while non-protected configurations registers may be used for non-protected operations and may be accessible to non-protected hardware and/or software. In one embodiment, protected configuration registers may be implemented in physical registers that are physically and permanently distinct from non-protected registers. In another embodiment, one or more physical registers may be programmably designated as protected or non-protected at different times. In still another embodiment, one or more physical registers may be designated as both protected and non-protected, and be accessible by both protected and non-protected operations through different addresses.

In a particular embodiment, some configurations registers may be physically implemented in MCH 121 (e.g., configuration registers 125, 127, in FIG. 1), while other configuration registers may be physically implemented in ICH 131 (e.g., configuration registers 135, 137 in FIG. 1). Each group may include both protected (e.g., 125, 135) and non-protected (e.g., 127, 137) configuration registers. In such an embodiment, MCH 121 may pass on to ICH 131 and any command directed to an address in configuration registers 135, 137 or that is otherwise implementable through ICH 131.

In one embodiment, logic circuit 120 may have a fuse, or its circuit equivalent, that may be blown at manufacturing time and is inaccessible after manufacturing, to disable (or alternately to enable) the operation of some or all of the protected configuration space, so that a single integrated circuit may be manufactured for both protected and non-protected applications, with the choice being a simple manufacturing operation rather than a circuit change.

In one embodiment, the configuration space is accessible only by processors 110, so that no other bus masters, I/O devices, or other internal devices are permitted to access the configuration space. Attempted commands to the configuration space by non-permitted devices may be handled in various ways, including but not limited to: 1) ignore the command, 2) return a default value such as all 0's or all 1's in response to a read command, 3) return an error code, 4) generate a system interrupt, and 5) generate a system reset.

Non-protected configuration space may be accessed by commands initiated from non-protected microcode 114.

In one embodiment, protected configuration space may be accessed in either of two ways: 1) By issuing certain designated commands implemented through protected microcode 116. Commands issued to protected configuration space from non-protected microcode 114 will not succeed. 2) By issuing a command from protected microcode 116 that opens the protected configuration space to access by commands from non-protected microcode 114 and then executing the commands from non-protected microcode 114. A separate command from protected microcode 116 may close the protected configuration space to further access by commands from non-protected microcode 114.

In some embodiments, the specific ones of protected configuration registers 125, 127 may be further restricted from access. Such restrictions may include, but are not limited to: 1) permitting read access but not write access by one or more particular processors 110, 2) restricting both read and write access by one or more particular processors 110, and 3) restricting modification of certain bits of the register.

In one embodiment, processors 110 may be prevented from caching any addresses within the protected configuration space 141. In another embodiment, processors 110 may be prevented from caching any addresses within both the protected configuration space 141 and the non-protected configuration space 142.

Each valid address within the configuration space 141, 142 may be mapped to various circuits, including but not limited to one or more of 1) a particular configuration register, 2) the logic to perform the associated internal action, and 3) another bus for passing the command on to a device external to logic circuit 120. In one embodiment, multiple addresses may be mapped to the same configuration register, internal action, or external bus. In one embodiment, an address in protected configuration space and an address in non-protected configuration space may be mapped to the same configuration register, internal action, or external bus. In a particular embodiment, one of two addresses that are mapped to the same configuration may be limited to a read operation, while the other address may not be so restricted.

In some embodiments, the mapping logic is included in configuration space control logic 124. In one embodiment, the mapping used may be hard-wired at the time of manufacture. In another embodiment, the mapping may be programmed into non-volatile memory. In still another embodiment, the mapping may be programmed into volatile memory when the system is initialized and/or when the protected operating environment is initialized.

As will be discussed, according to embodiments of the invention, a virtual machine monitor (VMM) operable in conjunction with a host execution mode of the processor may create at least one protected mode environment to operate guest software in a virtual machine. Responsive to a command to switch between protected modes, the VMM causes the processor to atomically switch between an original protected mode environment and a target protected mode environment. A virtual machine execution (VMX) mode may be utilized to enable virtual machine functionality for use in switching between protected modes. Further, a virtual machine control structure (VMCS) may be utilized to store state information related to the original and target protected modes for use in atomically switching between the two.

Figure 2:
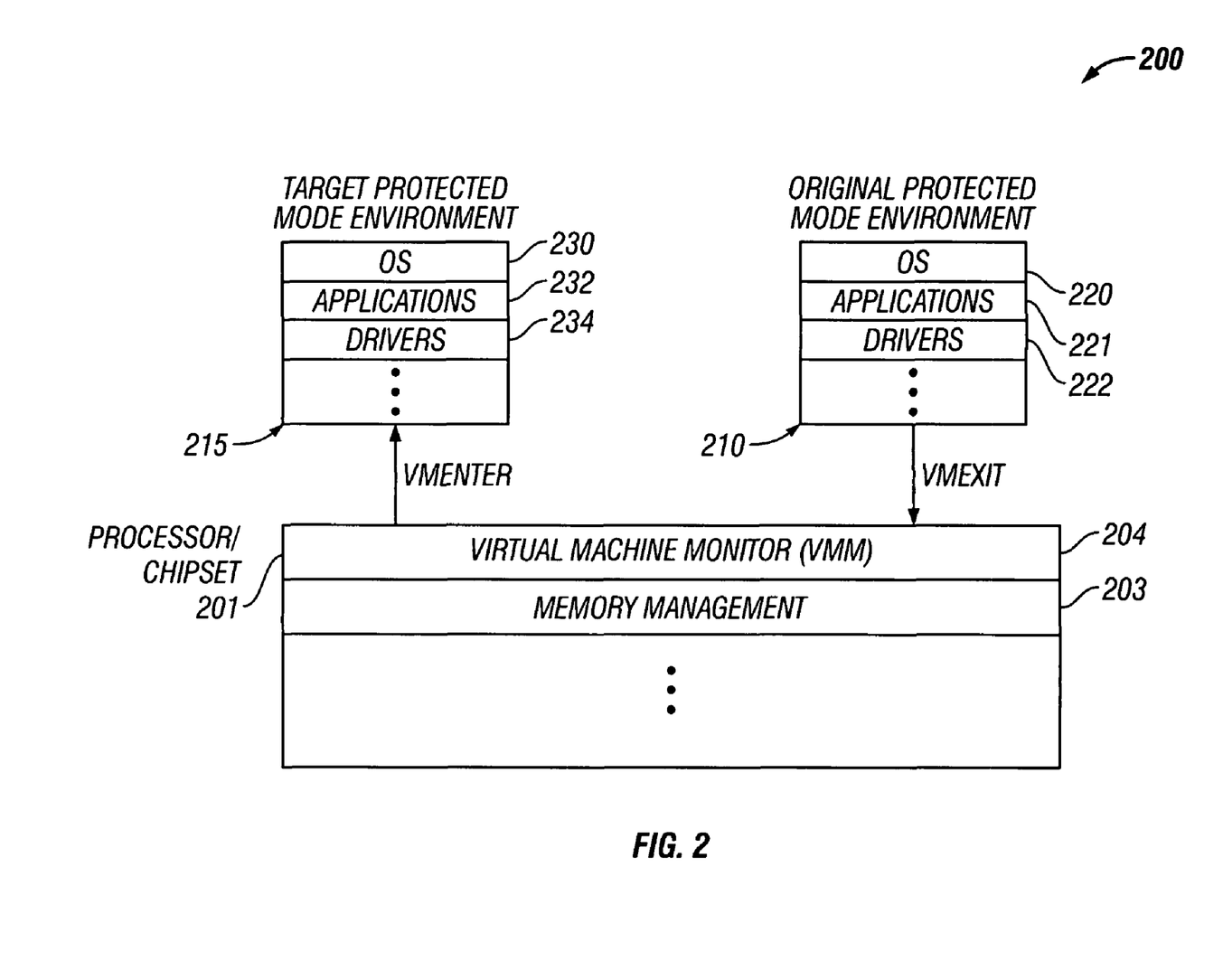
FIG. 2 shows a block diagram of a system having a virtual machine monitor (VMM) that may be used for switching between protected modes in a host execution environment utilizing virtual machine functionality, according to one embodiment of the invention.

With reference to FIG. 2, FIG. 2 shows a block diagram of a system 200 having a virtual machine monitor (VMM) that may be used for switching between protected modes in a host execution environment utilizing virtual machine functionality, according to one embodiment of the invention. Particularly, FIG. 2 illustrates a processor and/or chipset 201 that operates in a normal execution mode and a host execution mode.

The host execution mode may utilize virtual machine functionality and may create a secure execution environment, which operates utilizing protected microcode and protected memory, alone, or in conjunction with non-protected microcode instructions and non-protected memory, as previously discussed. On the other hand, the host execution mode may, in conjunction with virtual machine functionality, only utilize non-protected microcode instructions and non-protected configuration memory spaces. In the normal execution mode, virtual machine functionality, protected microcode, and protected memory is not utilized. spaces. In the normal execution mode, virtual machine functionality, protected microcode, and protected memory is not utilized.

The processor and/or chipset 201 further implements a virtual machine monitor (VMM) 204 to aid in implementing the host execution mode. In one embodiment, the host execution mode enables a plurality of separate protected mode environments to be created. These protected mode environments may run guest software. In one embodiment, these protected mode environments may operate as virtual machines. Additionally, memory management functionality 203 is utilized to allocate memory to implement the protected mode environments, for example, as virtual machines.

For example, as shown in FIG. 2, an original protected mode environment 210 may be created by the processor 201 operating in a host execution environment to implement guest software (e.g. an operating system 220, applications 221, drivers 222, etc.). In one embodiment, the original protected mode environment 210 may operate as a virtual machine.

In one embodiment, the protected virtual machine monitor 204 enables an atomic switch between the original protected mode environment 210 and a target protected mode environment 215. The target protected mode environment 215 may operate software (e.g. an operating system 230, applications 232, drivers 234, etc.). In one embodiment, the target protected mode environment 215 may operate as a virtual machine.

As will be described in more detail below, in one embodiment, in response to a command from software operating in the original protected mode environment 210, the virtual machine monitor 204 will cause the processor 201 to enter a virtual machine extension (VMX) mode. The virtual machine monitor 204 further stores the original protected mode state and the target protected mode state, exits out of the original protected mode state, enters the target protected mode state, exits out of the virtual machine extension mode, and then resumes operation in the target protected mode environment under the control of a new software application.

In one embodiment, the virtual machine monitor 204 utilizes virtual machine extensions (VMXs) to accomplish this switching between the original protected mode environment and the target protected mode environment. For example, virtual machine extension instruction support is presently available in such processors as INTEL ARCHITECTURE (IA) 32-bit processors, as well as, other commercially available processors.

In one embodiment, an instruction or command (e.g. a virtual monitor call (e.g. VMCALL)) allows software operating in the original protected mode environment 210 to force a virtual machine exit (e.g. VMEXIT) command to the virtual machine monitor 204. After certain operations, as will be discussed later in more detail, the virtual machine monitor 204 may initiate a command or instruction (e.g. a virtual machine resume (e.g. VMRESUME) or a virtual machine launch (e.g. VMLAUNCH)) to cause a virtual machine entry (e.g. VMENTER) in order to switch contexts to the target protected mode environment 215. It should be appreciated that, although embodiments of the invention described herein are described as using virtual machine extension (VMX) functionality and virtual machines, that depending on the desired implementation, the original and/or target protected mode environments may or may not be required to operate as virtual machines.

Figure 3:
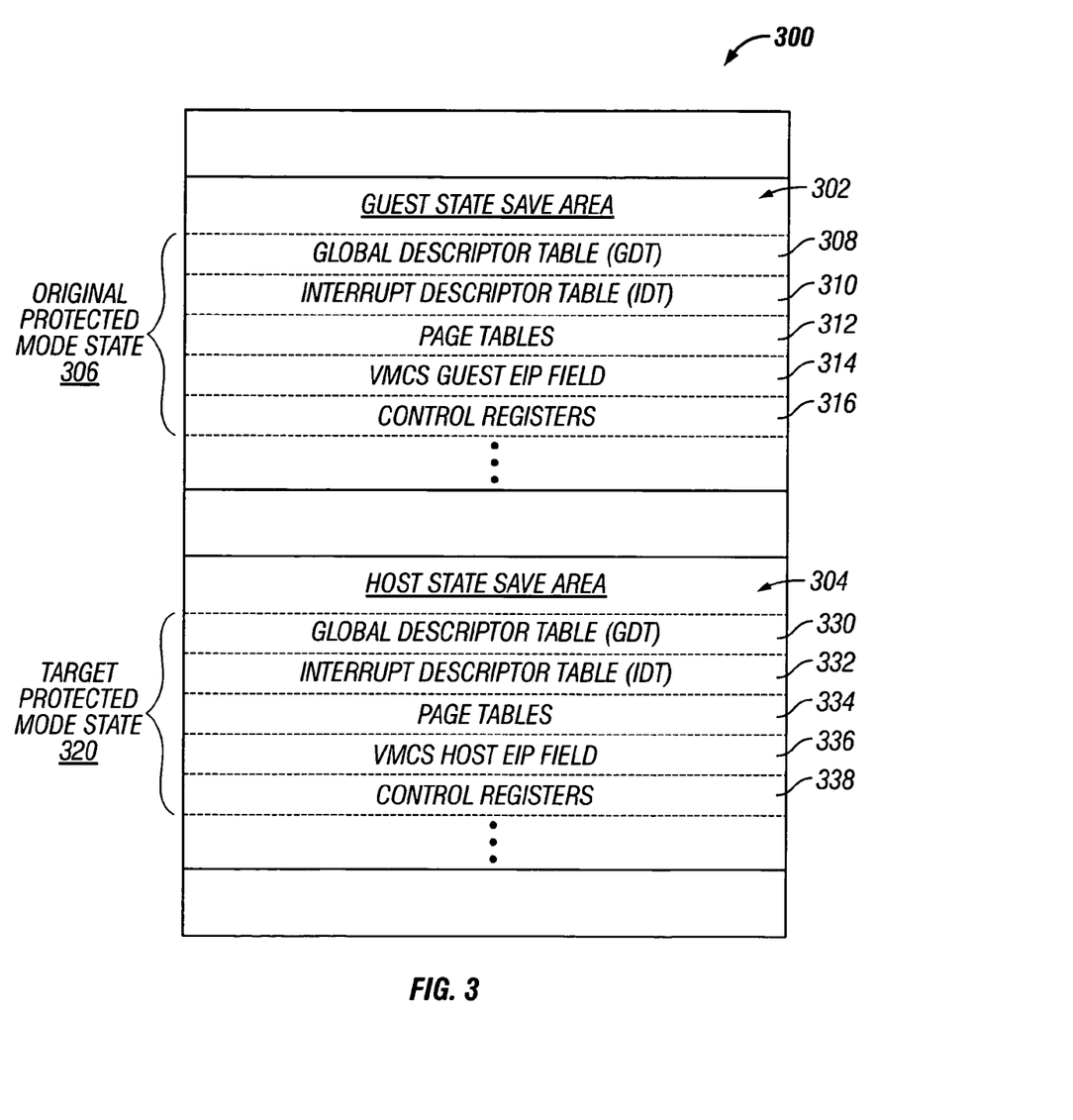
FIG. 3 shows a block diagram of an example of a virtual machine control structure (VMCS), according to one embodiment of the invention.

The transition between the original protected mode environment 210 and the target protected mode environment 215 by the virtual machine monitor 204, in one embodiment, may be facilitated by the use of a virtual machine control structure (VMCS). With reference now to FIG. 3 in conjunction with FIG. 2, FIG. 3 shows a block diagram of an example of a virtual machine control structure (VMCS) 300 according to one embodiment of the invention. As shown in FIG. 3, the virtual machine control structure 300 includes a guest state area 302 to store the original protected mode environment state 306 and a host state save area 304 to store the target protected mode environment state 320.

In one embodiment, the virtual machine control structure 300 is used to determine what states are loaded and stored upon a virtual machine exit (e.g. VMEXIT) and a virtual machine enter (e.g. VMENTER), respectively.

For example, in one embodiment, during a trap from software operating in the original protected mode environment 210 to the virtual machine monitor 204, (e.g. a virtual machine exit (e.g. VMEXIT)), the original protected mode environment state 306 is stored to the guest state save area 302 of the virtual machine control structure 300. In one embodiment, the original protected mode environment state 306 may include a global descriptor table (GDT) 308, an interrupt descriptor table (IDT) 310, page tables 312, a VMCS guest entry point (EIP) field 314, and various control registers 316.

As previously discussed, a wide variety of different protected modes, having different levels of security, may be defined by the processor, as previously discussed. Generally, a protected mode state is a set of settings for different processor registers including the previously-described GDT, IDT, page tables, as well as control registers (e.g. CR0, CR1, CR2, CR3, CR4, etc.). For example, in one embodiment, a CR0 may define protected mode paging, CR2 may define virtual addresses, CR3 may define physical addresses of page tables, CR4 may define page faults, etc. It should be appreciated by those of skill in the art that a variety of different descriptors and controls may be used to define areas of memory.

In one embodiment, the VMCS guest EIP field 314 points to the address of a command to force an exit (e.g. a VMEXIT) to the virtual machine monitor 204.

Similarly, in one embodiment, the host state save area 304 stores the target protected mode environment state 320 including a global descriptor table (GDT) 330, an interrupt descriptor table (IDT) 332, page tables 334, a VMCS host entry point (EIP) field 336 and control registers 338. The control registers 338 are similar to the previously-described control registers 316, but instead are related to the target protected mode environment state. The VMCS host EIP field 336 points to a command to instruct the processor to exit out of a virtual machine extension (VMX) mode.

Thus, the virtual machine monitor 204 in conjunction with the virtual machine control structure (VMCS) 300, provides a mechanism utilizing virtual machine extension (VMX) features that can be used to facilitate a transition between an original protected mode environment 210 to a target protected mode environment 215 in an atomic fashion.

Figure 4:
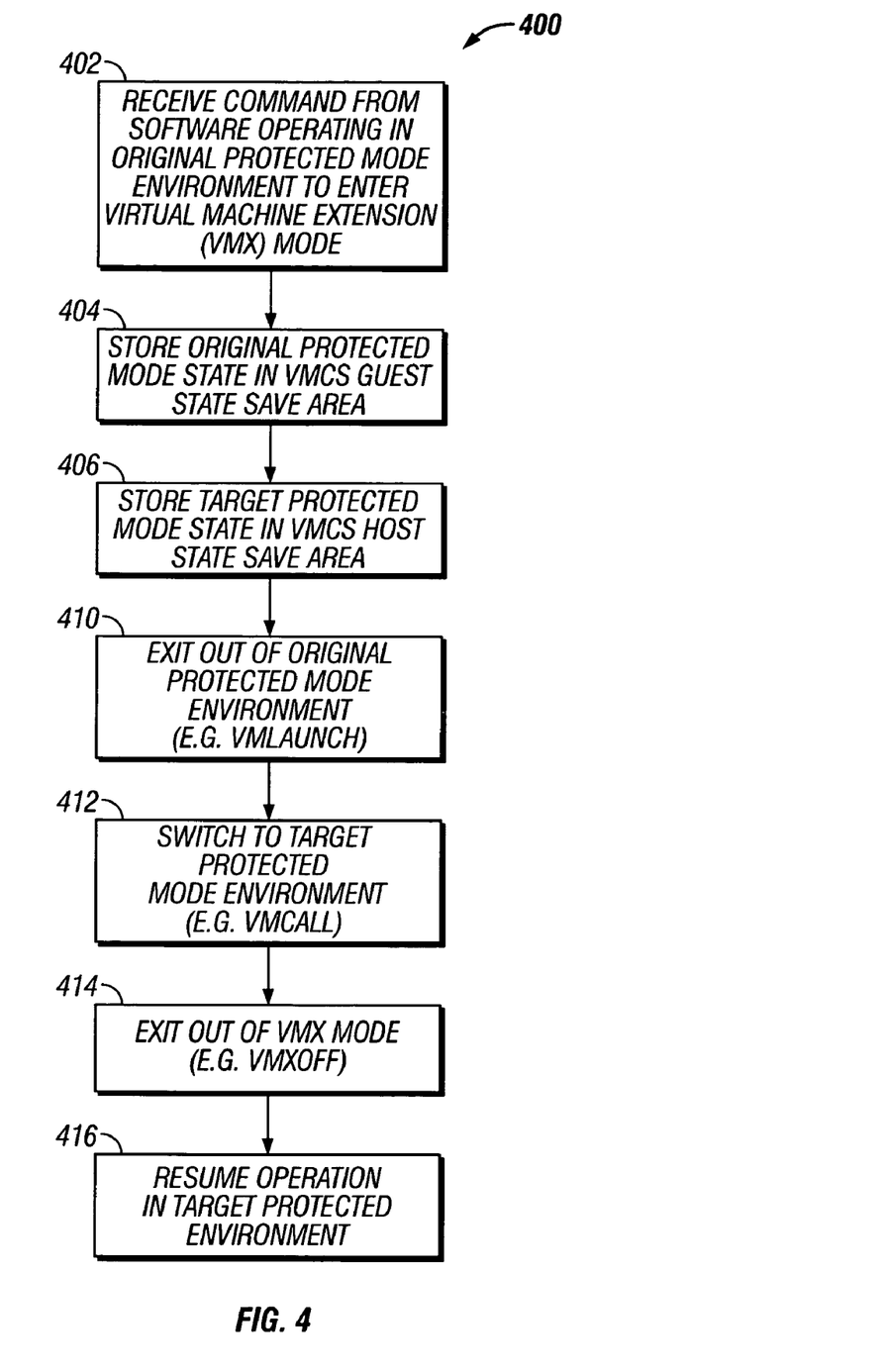
FIG. 4 shows a flow diagram illustrating a process to switch between an original protected mode environment to a target protected mode environment in a host execution environment utilizing virtual machine functionality, according to one embodiment of the invention.

Particularly, turning now to FIG. 4, FIG. 4 shows a flow diagram illustrating a process 400 to switch between an original protected mode environment to a target protected mode environment utilizing virtual machine functionality, according to one embodiment of the invention. As shown in FIG. 4, at block 402, a command is received from software operating in the original protected mode environment to enter a virtual machine extension (VMX) mode.

The original protected mode environment state is then stored in the VMCS guest state save area (block 404). Next, the target protected mode environment state is stored in the VMCS host state save area (block 406).

The original protected mode environment is then exited (e.g. utilizing a VMLAUNCH command) (block 410) and the target protected mode environment is switched to (e.g. utilizing a VMCALL command) (block 412). The processor then exits out of the virtual machine extension (VMX) mode (e.g. utilizing a VMXOFF command) (block 414). Now, the processor resumes operation in the target protected mode environment (block 416).

Figure 5:
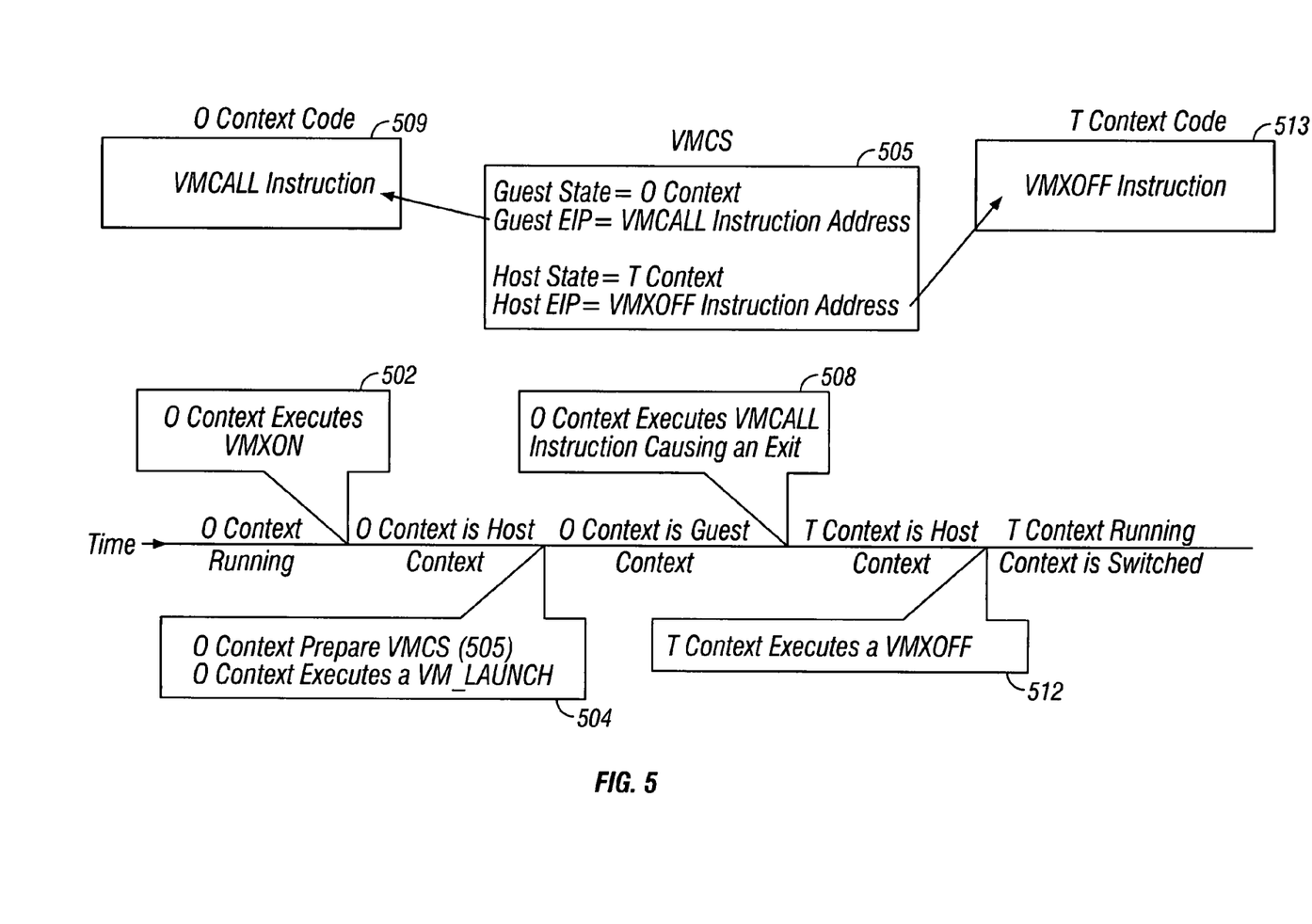
FIG. 5 shows a time-line flow diagram of pseudo-code that further illustrates a process to switch between an original protected mode environment to a target protected mode environment utilizing virtual machine functionality, according to one embodiment of the invention

More particularly, turning now to FIG. 5, FIG. 5 shows a time-line flow diagram of pseudo-code that further illustrates a process 500 to switch between an original protected mode environment to a target protected mode environment using virtual machine functionality, according to one embodiment of the invention.

At block 502 the original protected mode environment or context (referred to in FIG. 5 as "O context") executes a virtual machine extension on instruction (e.g. a VMXON instruction) to turn on virtual machine extension (VMX) functionality in the processor. This allows for the execution of virtual machine instructions. The original protected mode environment is now running as a virtual machine extension host.

At block 504, the original protected mode environment then prepares the virtual machine control structure (VMCS) 300 (as previously discussed with reference to FIG. 3). Particularly, the original protected mode environment allocates memory for the virtual machine control structure 300. The original protected mode environment performs memory clear and pointer operations to initialize and make active the virtual machine control structure 300. For example, the original protected mode environment may perform a series of write instructions (e.g. virtual machine write instructions (VM-WRITE instructions)) to load the VMCS guest state save area 302 with the original protected mode environment context, as previously discussed.

Further, the original protected mode environment performs a series of write instructions (e.g. VMWRITE instructions) to load the VMCS's host state save area 304 with the target protected mode environment context. The VMCS guest state save area 302 then contains the original protected mode environment context and the host state save area 304 contains the target protected mode environment context.

Further, the original protected mode environment loads the VMCS's guest EIP field 314 of the guest state save area 302 with the address of an instruction (e.g. a virtual machine call instruction (e.g. VMCALL instruction)) which forces a virtual machine exit (e.g. a VMEXIT to a virtual machine monitor, as previously discussed). Moreover, the original protected mode environment loads a VMCS host EIP field 336 of the VMCS host state save area 304 with the address of an entry point for the target protected mode environment that includes an instruction to exit virtual machine extension functionality (e.g. a VMXOFF instruction).

Thus, as shown in block 505, the virtual machine control structure (VMCS) has been prepared. For example, as shown in block 505 the guest state has been set to the original protected mode environment (e.g. "O context") and the guest entry point field has been set to the VMCALL instruction address. Further, the host state has been set to the target protected mode environment (e.g. "T context") and the host EIP address has been set to the VMXOFF instruction address to exit out of virtual machine extension (VMX) functionality.

Then, as shown in block 504, the original protected mode environment executes a launch instruction (e.g. a VMLAUNCH instruction) to load the processor with the VMCS's guest state save area containing the original protected mode environment state such that the original protected mode environment is operating as a "Guest" in the virtual machine extension functionality context.

At block 508, the original protected mode environment executes an instruction (e.g. a VMCALL instruction) (block 509) that forces a virtual machine exit (VMEXIT). In one embodiment, the VMEXIT causes a trap to a virtual machine monitor, as previously discussed. The processor is now operating in a virtual machine extension (VMX) host context that has been prepared to contain the target protected mode environment context. Thus, the target protected mode environment (e.g. "T context") is now the host. Particularly, in one embodiment, a virtual machine enter (VMENTER) is performed and the target protected mode environment state 320 from the VMCS is loaded such that the processor is now in the target protected mode environment context and the "T context" is the host. It should be appreciated that embodiments of the invention may operate with virtual machine containers or without virtual machine containers.

Further, while operating in the host target protected mode environment context, the processor executes a virtual machine extension off instruction (e.g. VMXOFF instruction) at block 512 such that virtual machine extension (VMX) functionality is turned off. For example, as shown in block 513 the target protected mode environment code includes the VMXOFF instruction, which turns off the virtual machine extension (VMX) functionality.

Thus, at block 512, the target protected mode environment has turned the virtual machine extension functionality off (e.g. by executing a VMXOFF instruction). The target protected mode environment now continues to run in the desired protected mode state without virtual machine extension functionality.

By using the previously-described process 500, the processor is never left in an inconsistent state, as occurs in standard task-switch based context switching. Therefore, the processor is never left in an inconsistent processor state while transitioning between two protected mode environments. The process 500 accomplishes the transition between the two protected processor states atomically, thus insuring a consistent protected mode environment at all times. Particularly, problems associated with faults and page misses due to inconsistent processor states, which could institute a reset or crash are avoided. Thus, the previously described process improves system reliability and stability.

While embodiments of the present invention and its various functional components have been described in particular embodiments, it should be appreciated that the embodiments of the present invention can be implemented in hardware, software, firmware, middleware or a combination thereof and utilized in systems, subsystems, components, or sub-components thereof. When implemented in software or firmware, the elements of the present invention are the instructions/code segments to perform the necessary tasks. The program or code segments can be stored in a machine readable medium (e.g. a processor readable medium or a computer program product), or transmitted by a computer data signal embodied in a carrier wave, or a signal modulated by a carrier, over a transmission medium or communication link. The machine-readable medium may include any medium that can store or transfer information in a form readable and executable by a machine (e.g. a processor, a computer, etc.). Examples of the machine-readable medium include an electronic circuit, a semiconductor memory device, a ROM, a flash memory, an erasable programmable ROM (EPROM), a floppy diskette, a compact disk CD-ROM, an optical disk, a hard disk, a fiber optic medium, a radio frequency (RF) link, etc. The code segments may be downloaded via networks such as the Internet, Intranet, etc.

Further, while embodiments of the invention have been described with reference to illustrative embodiments, these descriptions are not intended to be construed in a limiting sense. Various modifications of the illustrative embodiments, as well as other embodiments of the invention, which are apparent to persons skilled in the art to which embodiments of the invention pertain, are deemed to lie within the spirit and scope of the invention.

What is claimed is:

1. An apparatus comprising:
   a processor having a normal execution mode and a host execution mode operable in a computer system, wherein the normal execution mode executes without any virtual machine functionalities;
   a virtual machine monitor (VMM) implemented on the host execution mode creates original and target protected mode environments in two separate virtual machines to operate guest software, wherein responsive to a command to switch between the protected modes, the VMM causes the processor to atomically switch between the original protected mode environment and the target protected mode environment; and
   a virtual machine control structure (VMCS) to store state information for use in switching between the original protected mode environment and the target protected mode environment, the VMCS to store state information related to the original protected mode environment, wherein after the VMM receives a command from the original protected mode environment to enter a virtual machine extension (VMX) mode, the VMM causes the processor to enter the VMX mode to switch between the original and target protected mode environments;
   wherein the switch between the environments includes the VMM storing the original and target protected mode states in the VMCS, exiting out of the original protected mode environment, entering into the target protected mode environment, and then the VMM causing the target protected mode environment to exit out of the VMX mode such that the same processor of the computer system resumes operation in the target protected mode environment.

2. The apparatus of claim 1, wherein the virtual machine control structure (VMCS) further stores state information related to the target protected mode environment.

3. The apparatus of claim 2, wherein the virtual machine control structure (VMCS) further stores a guest entry point field to point to a command used for instructing the processor to exit out of the original protected mode environment and a host entry point field to point to a command to instruct the processor to exit out of a virtual machine execution (VMX) mode.

4. The apparatus of claim 1, wherein guest software operable in a protected mode environment includes an operating system.

5. A method comprising:
providing a normal execution mode in a processor and a host execution mode in a processor operable in a computer system, wherein the normal execution mode executes without any virtual machine functionalities;
creating original and target protected mode environments in two separate virtual machines to operate guest software utilizing a virtual machine monitor (VMM) implemented in the host execution mode, wherein responsive to a command to switch between the protected modes, atomically switching between the original protected mode environment and the target protected mode environment utilizing the VMM; and
storing state information in a virtual machine control structure (VMCS) for use in switching between the original protected mode environment and the target protected mode environment including storing state information related to the original protected mode environment, wherein after the VMM receives a command from the original protected mode environment to enter a virtual machine extension (VMX) mode, the VMM causes the processor to enter the VMX mode to switch between the original and target protected mode environments and wherein the switch between the environments includes the VMM storing the original and target protected mode states in the VMCS, exiting out of the original protected mode environment, entering into the target protected mode environment, and then the VMM causing the target protected mode environment to exit out of the VMX mode such that the same processor of the computer system resumes operation in the target protected mode environment.

6. The method of claim 5, further comprising storing state information related to the target protected mode environment.

7. The method of claim 6, further comprising:
storing a guest entry point field to point to a command used for instructing the processor to exit out of the original protected mode environment; and
storing a host entry point field to point to a command to instruct the processor to exit out of a virtual machine execution (VMX) mode.

8. The method of claim 5, wherein guest software operable in a protected mode environment includes an operating system.

9. A machine-readable medium of a storage device having tangibly stored thereon instructions, which when executed by a machine, cause the machine to perform the following operations comprising:
providing a normal execution mode in a processor and a host execution mode in a processor operable in a computer system, wherein the normal execution mode executes without any virtual machine functionalities;
creating original and target protected mode environments in two separate virtual machines to operate guest software utilizing a virtual machine monitor (VMM) implemented in the host execution mode, wherein responsive to a command to switch between the protected modes, atomically switching between the original protected mode environment and the target protected mode environment utilizing the VMM; and
storing state information in a virtual machine control structure (VMCS) for use in switching between the original protected mode environment and the target protected mode environment including storing state information related to the original protected mode environment, wherein after the VMM receives a command from the original protected mode environment to enter a virtual machine extension (VMX) mode, the VMM causes the processor to enter the VMX mode to switch between the original and target protected mode environments and wherein the switch between the environments includes the VMM storing the original and target protected mode states in the VMCS, exiting out of the original protected mode environment, entering into the target protected mode environment, and then the VMM causing the target protected mode environment to exit out of the VMX mode such that the same processor of the computer system resumes operation in the target protected mode environment.

10. The machine-readable medium of claim 9, further comprising storing state information related to the target protected mode environment.

11. The machine-readable medium of claim 10, further comprising:
storing a guest entry point field to point to a command used for instructing the processor to exit out of the original protected mode environment; and
storing a host entry point field to point to a command to instruct the processor to exit out of a virtual machine execution (VMX) mode.

12. The machine-readable medium of claim 9, wherein guest software operable in a protected mode environment includes an operating system.

13. A system comprising:
a processor including virtual machine extension (VMX) instruction support, the processor further having a normal execution mode and a host execution mode operable in a computer system, wherein the normal execution mode executes without any virtual machine functionalities;
a virtual machine monitor (VMM) implemented on the host execution mode creates original and target protected mode environments in two separate virtual machines to operate guest software, wherein responsive to a command to switch between the protected modes, the VMM causes the processor to atomically switch between the original protected mode environment and the target protected mode environment; and
a virtual machine control structure (VMCS) to store state information for use in switching between the original protected mode environment and the target protected mode environment, the VMCS to store state information related to the original protected mode environment, wherein after the VMM receives a command from the original protected mode environment to enter a virtual machine extension (VMX) mode, the VMM causes the processor to enter the VMX mode to switch between the original and target protected mode environments;

wherein the switch between the environments includes the VMM storing the original and target protected mode states in the VMCS, exiting out of the original protected mode environment, entering into the target protected mode environment, and then the VMM causing the target protected mode environment to exit out of the VMX mode such that the same processor of the computer system resumes operation in the target protected mode environment.

14. The system of claim 13, wherein the virtual machine control structure (VMCS) further stores state information related to the target protected mode environment.

15. The system of claim 14, wherein the virtual machine control structure (VMCS) further stores a guest entry point field to point to a command used for instructing the processor to exit out of the original protected mode environment and a host entry point field to point to a command to instruct the processor to exit out of a virtual machine execution (VMX) mode.

16. The system of claim 13, wherein guest software operable in a protected mode environment includes an operating system.

* * * * *